United States Patent
Min

(10) Patent No.: US 10,629,968 B2
(45) Date of Patent: Apr. 21, 2020

(54) BATTERY PACK INCLUDING COOLANT LEAKAGE SAFETY DEVICE

(71) Applicant: LG Chem, Ltd., Seoul (KR)

(72) Inventor: Kyoung-Choon Min, Daejeon (KR)

(73) Assignee: LG Chem, Ltd., Seoul (KR)

( * ) Notice: Subject to any disclaimer, the term of this patent is extended or adjusted under 35 U.S.C. 154(b) by 53 days.

(21) Appl. No.: 15/779,167

(22) PCT Filed: Jul. 4, 2017

(86) PCT No.: PCT/KR2017/007101
§ 371 (c)(1),
(2) Date: May 25, 2018

(87) PCT Pub. No.: WO2018/008947
PCT Pub. Date: Jan. 11, 2018

(65) Prior Publication Data
US 2018/0351222 A1 Dec. 6, 2018

(30) Foreign Application Priority Data
Jul. 5, 2016 (KR) .......................... 10-2016-0084809

(51) Int. Cl.
*H01M 10/6552* (2014.01)
*H01M 2/10* (2006.01)
(Continued)

(52) U.S. Cl.
CPC ......... *H01M 10/6552* (2015.04); *H01M 2/10* (2013.01); *H01M 2/34* (2013.01);
(Continued)

(58) Field of Classification Search
CPC ......... H01M 10/6552; H01M 10/4228; H01M 10/6568; H01M 10/613; H01M 2200/00;
(Continued)

(56) References Cited

U.S. PATENT DOCUMENTS 6,638,655 B2   10/2003   Gyoten et al.
9,564,666 B2   2/2017   Sohn
(Continued)

FOREIGN PATENT DOCUMENTS

DE   102014200789 A1   7/2015
EP   2701219 A2   2/2014
(Continued)

OTHER PUBLICATIONS

International Search Report and Written Opinion for Application No. PCT/KR2017/007101, dated Nov. 2, 2017 (11 pages) (with English translation of Search Report).

*Primary Examiner* — Gary D Harris
(74) *Attorney, Agent, or Firm* — Morgan, Lewis & Bockius LLP

(57) ABSTRACT

Provided is a battery pack including: a cell module assembly including a plurality of cell modules arranged at a predetermined interval; a pack structure surrounding and supporting the cell module assembly; a coolant pipe contacting the plurality of cell modules; and an absorbing body provided in the pack structure and configured to absorb a coolant when the coolant leaks in the coolant pipe.

18 Claims, 2 Drawing Sheets

(51) Int. Cl.
  *H01M 10/6567* (2014.01)
  *H01M 2/34* (2006.01)
  *H01M 10/6554* (2014.01)
  *H01M 10/42* (2006.01)
  *H01M 10/613* (2014.01)
  *H01M 10/6568* (2014.01)

(52) U.S. Cl.
  CPC ....... *H01M 10/42* (2013.01); *H01M 10/4228* (2013.01); *H01M 10/613* (2015.04); *H01M 10/6554* (2015.04); *H01M 10/6567* (2015.04); *H01M 10/6568* (2015.04); *H01M 2200/00* (2013.01)

(58) Field of Classification Search
  CPC ......... H01M 10/6554; H01M 10/6567; H01M 10/42; H01M 2/34; H01M 2/10
  USPC .......................................................... 429/90
  See application file for complete search history.

(56) References Cited

U.S. PATENT DOCUMENTS

| | | | |
|---|---|---|---|
| 9,761,887 | B2 | 9/2017 | Damon et al. |
| 9,972,872 | B2 | 5/2018 | Damon et al. |
| 2014/0234691 | A1 | 8/2014 | Lee et al. |
| 2017/0271726 | A1* | 9/2017 | Shen .................. H01M 10/613 |

FOREIGN PATENT DOCUMENTS

| | | |
|---|---|---|
| EP | 2731164 A1 | 5/2014 |
| EP | 2843727 A1 | 3/2015 |
| JP | 2001-297784 A | 10/2001 |
| JP | 2009-193881 A | 8/2009 |
| JP | 2014-534597 A | 12/2014 |
| JP | 2015-204267 A | 11/2015 |
| KR | 10-2012-0102344 A | 9/2012 |
| KR | 10-2014-0037305 A | 3/2014 |
| KR | 10-2015-0111757 A | 10/2015 |
| WO | 00/74163 A1 | 12/2000 |

* cited by examiner

BATTERY PACK INCLUDING COOLANT LEAKAGE SAFETY DEVICE

TECHNICAL FIELD

The present application claims priority to Korean Patent Application No. 10-2016-0084809 filed on Jul. 5, 2016 in the Republic of Korea, the disclosure of which is incorporated herein by reference.

The present disclosure relates to a battery pack including a coolant leakage safety device, and more particularly, to a battery pack including a cooling passage for cooling a cell module and having a structure for guaranteeing safety when a coolant supplied through the cooling passage leaks.

BACKGROUND

A lithium secondary battery pack is made by combining a plurality of unit cells into one pack and is widely used in applications requiring high energy such as a vehicle battery or an electric power storage device.

However, a battery pack including a plurality of unit cells generates heat and swells up during overcharging, and thus is deformed such that a cell module expands outward.

In general, in order to cool the battery pack, a cooling passage through which a coolant is flown to achieve heat exchange is formed in a case of the battery pack. In this regard, Japanese Patent Publication No. 2001-297784 discloses a stacked solid state macromolecular fuel cell free from such a malfunction that a part of a cell constructing member like a separator or the like, contacting cooling water, is corroded during a continuous operation for a long period, that battery performance is lowered due to the increased conductivity of cooling water, or that safety during a leakage may not be ensured.

Also, Korean Patent Publication No. 2015-0111757 discloses a water cooling device for a water cooling battery module that is coupled to a water cooling unit sub-module, which receives battery cells therein and includes a coolant inlet pipe and a coolant outlet pipe provided on one side thereof, and is configured to circulate a coolant in the water cooling unit sub-module.

However, a conventional cooling passage has drawbacks in that the conventional cooling passage takes up a large space in a case, and when a coolant leaks, the coolant is flown in all directions in the case, thereby leading to a battery malfunction or a safety-related accident.

SUMMARY

The present disclosure is designed to solve the problems of the related art, and therefore the present disclosure is directed to providing a battery pack having a structure for suppressing the flow of a coolant when the coolant leaks and preventing a battery malfunction due to the leaking coolant.

The present disclosure is also directed to providing a battery pack having a structure for recognizing and reporting occurrence of a risk by effectively detecting a leakage of a coolant.

In one aspect of the present disclosure, there is provided a battery pack including: a cell module assembly including a plurality of cell modules arranged at a predetermined interval; a pack structure surrounding and supporting the cell module assembly; a coolant pipe contacting the plurality of cell modules; and an absorbing body provided in the pack structure and configured to absorb a coolant when the coolant leaks in the coolant pipe.

The absorbing body may include a superabsorbent polymer that absorbs the coolant and maintains the coolant in a solid state.

The coolant pipe may be located between adjacent cell modules, and the absorbing body may be located under each of the plurality of cell modules.

The battery pack may further include a heat dissipating plate located under the cell module assembly, wherein the absorbing body is located between the cell module and the heat dissipating plate.

A water sensor for detecting that the coolant is absorbed may be provided in the absorbing body.

The water sensor may be inserted into the absorbing body.

The water sensor may have a wire or bar shape or a plate shape, and may be horizontally located in the absorbing body.

Alternatively, receiving portions, each having a circular or elliptical cross-sectional shape due to sewing of portions adjacent to both edges of the absorbing body, may extend in a longitudinal direction of the absorbing body.

The absorbing body may have a rectangular body capable of supporting a bottom surface of the cell module.

In another aspect of the present disclosure, there is also provided a safety device of a battery pack, the safety device provided in the battery pack including a cooling passage, the safety device including: an absorbing body having a body located under a cell module; a water sensor inserted into the absorbing body and configured to detect that a leaking coolant is absorbed by the absorbing body.

According to the present disclosure, when a coolant leaks, since the coolant is absorbed by an absorbing body and is maintained in a solid state, the flow of the coolant in a pack may be prevented and thus a battery malfunction due to the leakage may be prevented.

Also, since the leakage of the coolant is detected by a water sensor located in the absorbing body and the occurrence of a risk is reported, occurrence of an additional event may be prevented in advance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
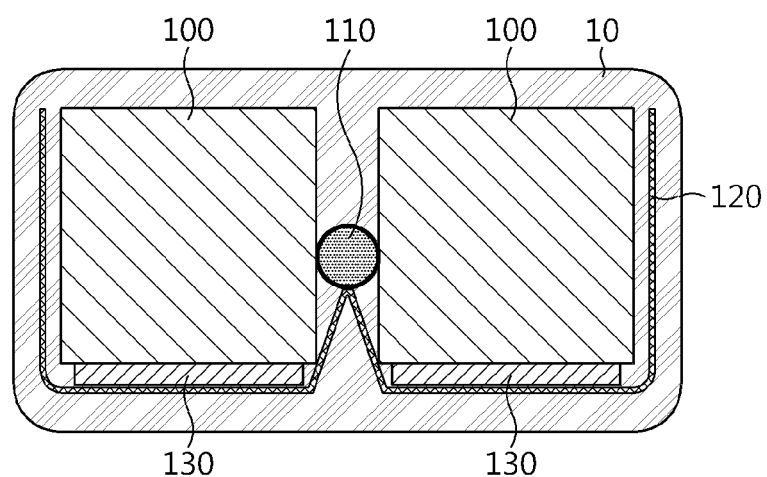
FIG. 1 is a cross-sectional view of a battery pack according to a preferred embodiment of the present disclosure.

FIG. 1 is a cross-sectional view of a battery pack according to a preferred embodiment of the present disclosure.

Referring to FIG. 1, the battery pack according to a preferred embodiment of the present disclosure includes a cell module assembly including a plurality of cell modules 100, a pack structure 10 supporting the cell modules 100, a coolant pipe 110 contacting the cell modules 100, and an absorbing body 130 functioning as a safety device for preventing a battery malfunction by absorbing a coolant leaking in the coolant pipe 110.

The cell module assembly includes the plurality of cell modules 100 arranged at a predetermined interval. A plurality of cells, preferably, pouch-type secondary battery cells, are provided in each of the plurality of cell modules 100. The plurality of cells are arranged at a predetermined interval in a main body of the cell module 100 to form a staked structure.

The pack structure 10 that surrounds and supports the cell module assembly may be formed in any of various shapes by using any of various materials.

The coolant pipe 110 is a pipe having a cooling passage through which the coolant for cooling heat generated in the cell modules 100 is flown. The coolant pipe 110 contacts side surfaces of the cell modules 100. In order to efficiently use a limited space, it is preferable that the coolant pipe 110 is located between adjacent cell modules 100 and contacts both the adjacent cell modules 100.

The absorbing body 130 is located under each of the cell modules 100 and, when the coolant leaks in the cooling pipe 110, absorbs the coolant. It is preferable that the absorbing body 130 is formed of a superabsorbent polymer (SAP) that absorbs the coolant and maintains the coolant in a solid state. In this configuration, when the coolant leaks, since the coolant is absorbed by the absorbing body 130 and is maintained in a solid state, the flow of the coolant in the pack structure 10 may be effectively prevented. Alternatively, the absorbing body 130 may be formed so that at least a part of the absorbing body 130 includes a fabric material.

Figure 2:
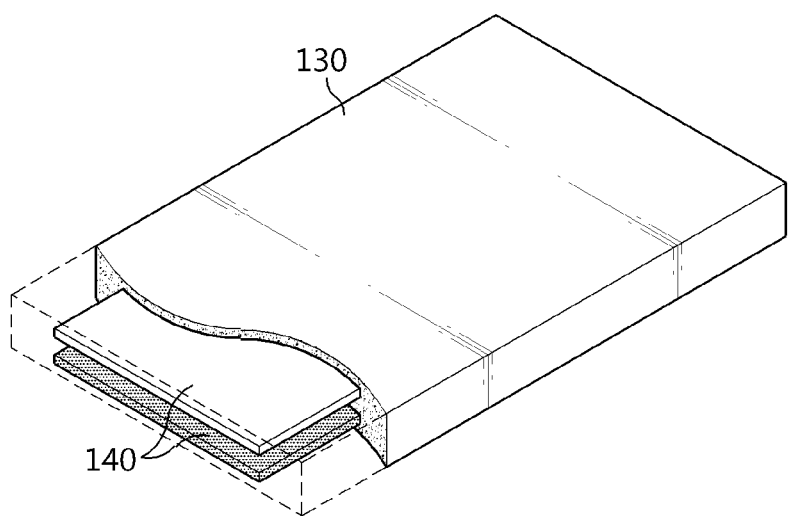
FIGS. 2 through 4 are perspective views illustrating examples where a water sensor is provided in an absorbing body of FIG. 1.

As shown in FIG. 2, a water sensor 140 for detecting that the coolant is absorbed is mounted in the absorbing body 130. It is preferable that the water sensor 140 is inserted into the absorbing body 130. In this configuration, since a leakage of the coolant is detected by the water sensor 140 and a risk is reported by the water sensor 140, an additional event may be prevented. The water sensor 140 may include one pair of sensing elements having different polarities. The water sensor 140 may have a substantially thin plate shape and may be horizontally located in the absorbing body 130.

Figure 3:
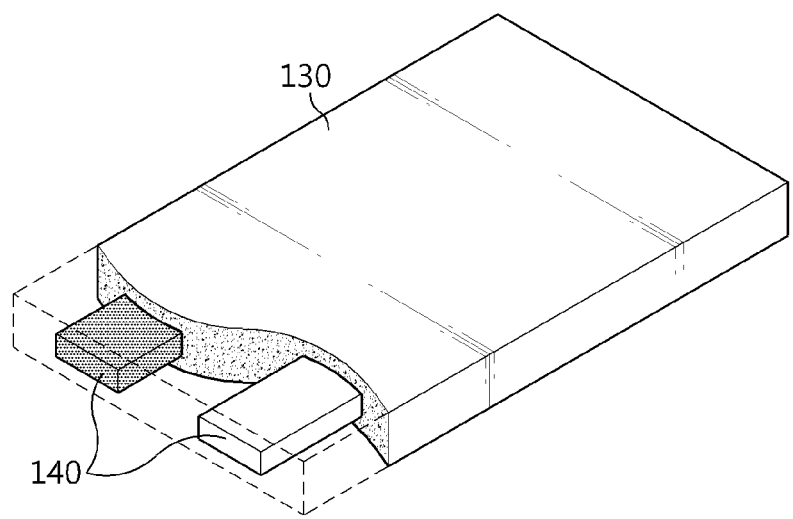

In another configuration, the water sensor 140 may have a bar shape and may be inserted into the absorbing body 130 having a plate shape as shown in FIG. 3. Since the water sensor 140 is inserted during a process of forming the absorbing body 130 by stacking pulps, the water sensor 140 may be located in the absorbing body 130.

Figure 4:
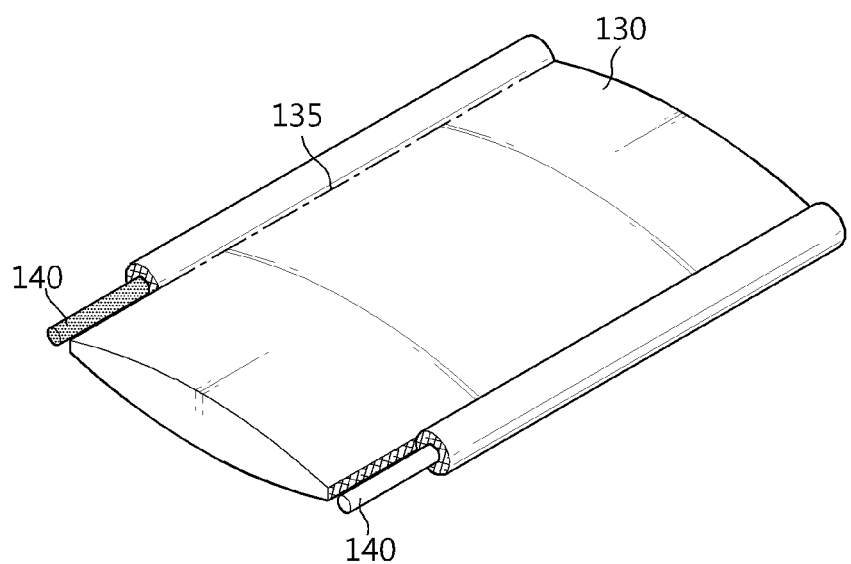

In another configuration, the water sensor 140 may have a wire shape and may be inserted into the absorbing body 130 as shown in FIG. 4. In this case, the absorbing body 130 is formed so that at least an edge portion or the whole of the absorbing body 130 includes a fabric material, and receiving portions each having a circular or elliptical cross-sectional shape due to sewing 135 of portions adjacent to both edges of the absorbing body 130 extend in a longitudinal direction of the absorbing body 130. Since the receiving portions are formed at both ends of the absorbing body 130, a central portion of the absorbing body 130 has an elliptical cross-sectional shape. The water sensor 140 includes an element having a wire shape and is inserted into each of the receiving portions of the absorbing body 130. Since the water sensor 140 having a wire shape is located in the receiving portion, the water sensor 140 may be stably maintained at its position.

In order to guarantee a sufficient contact area with the cell module 100, it is preferable that the absorbing body 130 has a rectangular body capable of supporting a bottom surface of the cell module 100.

In addition, a heat dissipating plate 120 having a predetermined shape and configured to improve heat dissipation performance may be located under the cell module assembly. In this case, the absorbing body 130 is stably provided by being located between the cell module 100 and the heat dissipating plate 120. According to this structure, the coolant may be effectively prevented from leaking, flowing to the bottom of the heat dissipating plate 120, and then being introduced into the cell module 100.

A portion of the heat dissipating plate 120 located between adjacent cell modules has a structure that is narrow at the top and wide at the bottom, and in this case, it is preferable that the coolant pipe 110 is located at an upper end of the structure that is narrow at the top and wide at the bottom. In this structure, when the coolant leaks in the coolant pipe 110, since the coolant is guided to flow along an inclined surface of the structure that is narrow at the top and wide at the bottom toward the absorbing body 130, a battery malfunction due to the leaking coolant may be more effectively prevented.

In the battery pack constructed as described above according to a preferred embodiment of the present disclosure, when the coolant leaks, since the coolant is absorbed by the absorbing body 130 located under the cell module 100 and is maintained in a solid state, the flow of the coolant in the pack may be prevented, thereby preventing a battery malfunction due to the leaking coolant.

Also, when the coolant leaks and is absorbed by the absorbing body 130, since the leakage of the coolant is detected by the water sensor 140 provided in the absorbing body 130 and is reported to a battery management system, an additional event may be prevented.

According to the present disclosure, there may be provided a battery packet that may prevent a battery malfunction due to a leakage of a coolant and may prevent the occurrence of an additional event due to the flow of the coolant.

What is claimed is:

1. A battery pack comprising:
   a cell module assembly comprising a plurality of cell modules arranged at a predetermined interval;
   a pack structure surrounding and supporting the cell module assembly;
   a coolant pipe contacting the plurality of cell modules; and
   an absorbing body provided in the pack structure and configured to absorb a coolant when the coolant leaks in the coolant pipe,
   wherein a water sensor for detecting that the coolant is absorbed is inserted into in the absorbing body, and
   wherein receiving portions, each having a circular or elliptical cross-sectional shape due to sewing of portions adjacent to both edges of the absorbing body, extend in a longitudinal direction of the absorbing body.

2. The battery pack of claim 1, wherein the absorbing body comprises a superabsorbent polymer that absorbs the coolant and maintains the coolant in a solid state.

3. The battery pack of claim 1, wherein the coolant pipe is located between adjacent cell modules, and the absorbing body is located under each of the plurality of cell modules.

4. The battery pack of claim 3, further comprising a heat dissipating plate located under the cell module assembly, wherein the absorbing body is located between the cell module and the heat dissipating plate.

5. The battery pack of claim 1, wherein the water sensor has a wire or bar shape or a plate shape, and is horizontally located in the absorbing body.

6. The battery pack of claim 1, wherein the absorbing body has a rectangular body capable of supporting a bottom surface of the cell module.

7. A safety device of a battery pack, the safety device provided in the battery pack comprising a cooling passage, the safety device comprising:
- an absorbing body having a body located under a cell module; and
- a water sensor inserted into the absorbing body and configured to detect that a leaking coolant is absorbed by the absorbing body,
- wherein receiving portions, each having a circular or elliptical cross-sectional shape due to sewing of portions adjacent to both edges of the absorbing body, extend in a longitudinal direction of the absorbing body, and
- wherein the water sensor is inserted into each of the receiving portions of the absorbing body.

8. The safety device of claim 7, wherein the water sensor has a wire or bar shape or a plate shape, and is horizontally located in the absorbing body.

9. The safety device of claim 7, wherein the absorbing body has a rectangular body capable of supporting a bottom surface of the cell module.

10. A battery pack comprising:
- a cell module assembly comprising a plurality of cell modules arranged at a predetermined interval;
- a pack structure surrounding and supporting the cell module assembly;
- a coolant pipe contacting the plurality of cell modules;
- a heat dissipating plate under the cell module assembly; and
- an absorbing body provided in the pack structure between the cell module assembly and the heat dissipating plate, and configured to absorb a coolant when the coolant leaks in the coolant pipe,
- wherein a portion of the heat dissipating plate between adjacent cell modules has an inclined surface such that the portion of the heat dissipating plate is narrow at an upper end and wide at a bottom end, and
- wherein the coolant pipe is at the upper end of the portion of the heat dissipating plate, whereby when the coolant leaks in the coolant pipe, the coolant is guided to flow along the inclined surface toward the absorbing body.

11. The battery pack of claim 10, wherein the absorbing body comprises a superabsorbent polymer that absorbs the coolant and maintains the coolant in a solid state.

12. The battery pack of claim 10, wherein the coolant pipe is located between adjacent cell modules, and the absorbing body is located under each of the plurality of cell modules.

13. The battery pack of claim 12, further comprising a heat dissipating plate located under the cell module assembly, wherein the absorbing body is located between the cell module and the heat dissipating plate.

14. The battery pack of claim 10, wherein a water sensor for detecting that the coolant is absorbed is provided in the absorbing body.

15. The battery pack of claim 14, wherein the water sensor is inserted into the absorbing body.

16. The battery pack of claim 15, wherein the water sensor has a wire or bar shape or a plate shape, and is horizontally located in the absorbing body.

17. The battery pack of claim 15, wherein receiving portions, each having a circular or elliptical cross-sectional shape due to sewing of portions adjacent to both edges of the absorbing body, extend in a longitudinal direction of the absorbing body.

18. The battery pack of claim 10, wherein the absorbing body has a rectangular body capable of supporting a bottom surface of the cell module.

\* \* \* \* \*